(12) United States Patent
Elzur

(10) Patent No.: US 8,386,642 B2
(45) Date of Patent: Feb. 26, 2013

(54) METHOD AND SYSTEM FOR VIRTUAL MACHINE NETWORKING

(75) Inventor: Uri Elzur, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 264 days.

(21) Appl. No.: 12/714,680

(22) Filed: Mar. 1, 2010

(65) Prior Publication Data

US 2010/0223397 A1 Sep. 2, 2010

Related U.S. Application Data

(60) Provisional application No. 61/156,186, filed on Feb. 27, 2009.

(51) Int. Cl.
*G06F 15/173* (2006.01)
(52) U.S. Cl. .................................. 709/241; 709/250
(58) Field of Classification Search .................. 709/227, 709/235, 238, 241, 250; 718/1
See application file for complete search history.

(56) References Cited

U.S. PATENT DOCUMENTS

| | | | | |
|---|---|---|---|---|
| 6,178,163 | B1 * | 1/2001 | Yuan et al. | 370/323 |
| 7,783,779 | B1 * | 8/2010 | Scales et al. | 709/240 |
| 7,802,000 | B1 * | 9/2010 | Huang et al. | 709/228 |
| 7,903,563 | B2 * | 3/2011 | Schollmeier et al. | 370/238 |
| 7,962,647 | B2 * | 6/2011 | Suri et al. | 709/238 |
| 7,984,123 | B2 * | 7/2011 | Tripathi et al. | 709/221 |
| 8,117,495 | B2 * | 2/2012 | Graham et al. | 714/11 |
| 2006/0045089 | A1 | 3/2006 | Bacher | |
| 2006/0233168 | A1 * | 10/2006 | Lewites et al. | 370/389 |
| 2007/0028002 | A1 | 2/2007 | McCanne | |
| 2007/0280243 | A1 * | 12/2007 | Wray et al. | 370/392 |
| 2008/0002683 | A1 | 1/2008 | Droux | |
| 2008/0155537 | A1 * | 6/2008 | Dinda et al. | 718/1 |
| 2008/0163207 | A1 | 7/2008 | Reumann | |
| 2009/0106439 | A1 * | 4/2009 | Twitchell, Jr. | 709/230 |
| 2009/0150521 | A1 * | 6/2009 | Tripathi | 709/220 |
| 2009/0150527 | A1 * | 6/2009 | Tripathi et al. | 709/221 |
| 2009/0292858 | A1 * | 11/2009 | Lambeth et al. | 711/6 |
| 2009/0300209 | A1 * | 12/2009 | Elzur | 709/234 |
| 2010/0095045 | A1 * | 4/2010 | Lambeth et al. | 711/6 |
| 2010/0223397 | A1 * | 9/2010 | Elzur | 709/235 |
| 2011/0125949 | A1 * | 5/2011 | Mudigonda et al. | 710/308 |

OTHER PUBLICATIONS

PCT International Search Report for International Patent Application No. PCT/US 10/25535, dated Feb. 26, 2010.
Notification Concerning Transmittal of International Preliminary Report on Patentability (Chapter 1 of the Patent Cooperation Treaty) of PCT/US2010/025535 dated Sep. 9, 2011; International Preliminary Report on Patentability with Written Opinion of the International Searching Authority dated Apr. 8, 2010. (7 pages).

* cited by examiner

*Primary Examiner* — Patrice Winder
(74) *Attorney, Agent, or Firm* — Thomas|Horstemeyer, LLP.

(57) ABSTRACT

Aspects of a method and system for networking are provided. In this regard, one or more circuits and/or processors in a network adapter of a first network device may determine whether to communicate traffic between virtual machines running on the first network device via a path that resides solely within the first network device, or via a path that comprises a second network device that is external to the first network device. The determination may be based, at least in part, on characteristics of the traffic. The determination may be based, at least in part, on capabilities and/or available resources of the network adapter. The determination may be based, at least in part, on management information exchanged between the one or more circuits and/or processors and one or more of: software running on the first network device, the second network device, and a third network device.

30 Claims, 10 Drawing Sheets

METHOD AND SYSTEM FOR VIRTUAL MACHINE NETWORKING

CROSS-REFERENCE TO RELATED APPLICATIONS/INCORPORATION BY REFERENCE

This patent application makes reference to, claims priority to and claims benefit from U.S. Provisional Patent Application Ser. No. 61/156,186 filed on Feb. 27, 2009.

The above stated application is hereby incorporated herein by reference in its entirety.

FIELD OF THE INVENTION

Certain embodiments of the invention relate to networking. More specifically, certain embodiments of the invention relate to a method and system for virtual machine networking.

BACKGROUND OF THE INVENTION

As the reliance on computer networking continues to grow, the need for faster and more efficient networking devices grows with it. However, these two goals are often at odds with each other. For example, virtualization is a technique that has become very popular for achieving increased efficiency in terms of resource utilization, but often has negative impacts in terms of throughput and/or latency. In an attempt to improve upon the speed and/or latency of virtual machines (VMs), some network device architectures enable one or more virtual machines running on that network device to communicate directly with a network adapter of that device without the aid of a virtual switch running in that devices in software and without the aid of an external network switch. In this manner, latencies and/or bottlenecks associated with the software based virtual switch or external network switches are avoided. In this regard, functionality such as Virtual Ethernet Bridging (VEB) enable inter-VM communication without the aid of an external network switch, and standards/protocols such as VEPA enable intra-VM communication via a specialized external network switch. However, solutions such as VEB and VEPA solve some problems associated with virtualization, they do not solve other problems associated with virtualization and, in fact, creates some additional problems.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for virtual machine networking, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

Referring to FIGS. 5A and 5B, there is shown the network devices 102 and 112.

DETAILED DESCRIPTION OF THE INVENTION

Figure 1:
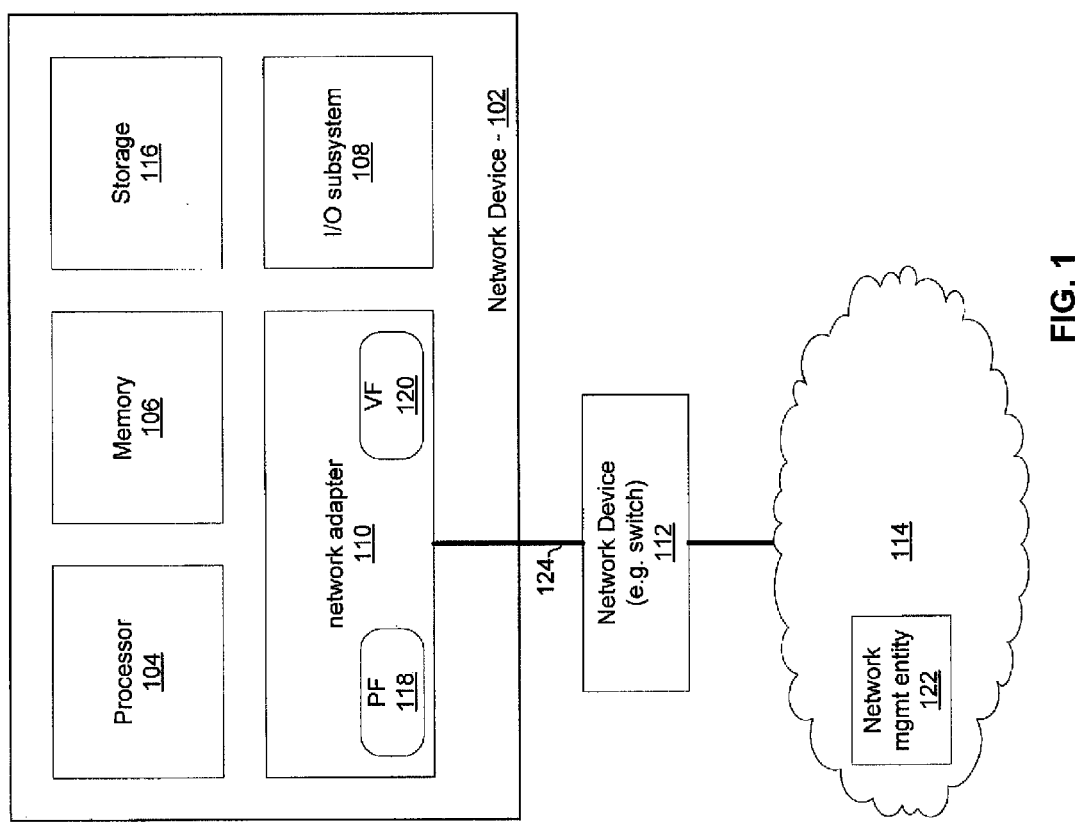
FIG. 1 is a diagram illustrating exemplary networking devices, in accordance with an embodiment of the invention.

Certain embodiments of the invention may be found in a method and system for virtual machine networking. In various embodiments of the invention, one or more circuits and/or processors in a network adapter of a first network device may determine whether to communicate traffic between virtual machines running on the first network device via a path that resides solely within the first network device, or via a path that comprises a second network device that is external to the first network device. The determination may be based, at least in part, on characteristics of the traffic. The determination may be based, at least in part, on capabilities and/or available resources of the network adapter. The determination may be based, at least in part, on management information exchanged between the one or more circuits and/or processors and one or more of: software running on the first network device, the second network device, and a third network device. The second network device may participate in network management protocols on behalf of the first network device. The management information may be exchanged via an application programming interface (API) made available by the one or more circuits and/or processors.

The traffic may be communicated via the path comprising the second network device in instances that addressing information associated with the traffic is not in an address table of the network adapter. The traffic may be communicated via the path comprising the second network device in instances that the network adapter is unable to perform one or more security functions required for handling the traffic. The traffic may be communicated via the path comprising the second network device in instances that the network adapter is unable to perform one or more management functions required for handling the traffic. In instances that the traffic is communicated via the path that comprises the second network device, the second network device may process the traffic and return the processed traffic to the first network device. Processing performed by the second network device may comprise, for example, looking up the addressing information associated with the traffic in an address table in the second network device, performing the one or more management functions required for handling the traffic, and/or performing the one or more security functions required for handling the traffic.

Also, the one or more circuits and/or processors may be operable to communicate a copy of the traffic, or a report on the traffic, to the second network device, and the second network device may utilize the copy of the traffic for management operations. One or more tags, fields, and/or headers of the copy of the traffic may enable the second network device to determine that the copy of the traffic is a copy. An indication from the one or more circuits and/or processors may enable the second network device to determine that the copy of the traffic is a copy. The indication may be communicated out-of-band from the copy of the traffic.

FIG. 1 is a diagram illustrating exemplary networking devices, in accordance with an embodiment of the invention. Referring to FIG. 1, there is shown a network device 102 comprising a host processor 104, a host memory 106, storage 116, an input/output subsystem 108, and a network adapter 110. Also shown is a second networking device 112, a remaining portion a network represented by a cloud 114, and a network management entity 122 residing in the cloud 114.

For purposes of illustration, the network device 102 may be assumed to be a server and the network device 112 may be assumed to be a network switch, but these devices are not so limited. That is, each of the network devices 102 and 112 could be any suitable networking device comprising a personal computer, mainframe, mobile device, router, bridge, switch, set-top-box, modem, and head-end.

The network device 112 may be similar in many respects to the network device 102. In this regard, the network device 112 may comprise suitable logic, circuitry, interfaces, and/or code for engaging in network communications and processing data in accordance with one or more networking standards. Unlike many conventional switches, the network device 112 may be operable to forward traffic via the same port, such as the port 220, on which the traffic was received. In this regard, the network device 112 may support VEPA or similar protocols. The network device 112 may be operable to function as a management proxy for the networking device 102. In this regard, the network device 112 may be operable to engage in management protocols such as port mirroring, spanning tree protocol, transparent interconnection of lots of links (TRILL), and simple network management protocol (SNMP), on behalf of the network device 102. That is, the network device 102 may interact with the network management entity 122 on behalf of the network device 102. Accordingly, the network device 112 may be operable to exchange management information with the network device 102 and these exchanges may be in-band or may be out-of-band with other traffic communicated between the network devices 102 and 112.

The network device 112 may also function as a proxy for any other management entity that may desire to manage the network device 102 and/or components thereof, such as a vSwitch. Such management may comprise, for example, controlling the configuration of, implementing security for, collecting statistics pertaining to, or providing tools that allow for debugging of the network device 102 or components thereof. In some embodiments of the invention, the other management entity may appear to the network device 102 as if it is local to or part of the network device 112. In other embodiments of the invention, the other management entity may appear to the network device 102 as if it is a device independent from the network device 112 and desiring to provide management functions via the network device 112 operating as a proxy.

The network adapter 110 may be coupled to the network device 112 via a link 124. In this regard, the link 124 may enable traffic to be off-device, that is, externally. The link may comprise, for example, a copper wiring, fiber optic cabling, one or more wireless channels, and/or a combination thereof The host processor 104 and the host memory 106 may comprise suitable logic, circuitry, interfaces and/or code that may enable processing of data and/or controlling of operations for the network device 102. The host processor 104 may comprise, for example, an x86 based CPU, an ARM, or an application specific integrated circuit (ASIC). The host memory 106 may comprise, for example, SRAM and/or DRAM that stores data and/or instructions. The host processor 104, utilizing the host memory 106, may be operable to run one or more operating systems and/or virtual machines (VMs), and may be operable to run and/or be controlled by a hypervisor for managing the operating systems and/or VMs. In this manner, the host processor 104, utilizing the host memory 106, may be operable to control operation of the various components of the network device 102. Such components may include a software switch, also referred to as a vSwitch, employed by the Hypervisor in order to provide inter-VM network connectivity and/or connectivity between VMs and the network 114.

The storage 116 may comprise, for example, a hard drive or solid state memory. The storage 116 may store, for example, data that may be read, written, and/or executed locally or remotely via the network adapter 110.

The I/O subsystem 108 may comprise suitable logic, circuitry, interfaces, and/or code that may be operable to, for example, communicate information between various components of the networking device 102. The I/O subsystem 108 may comprise one or more standardized busses and one or more bus controllers. Accordingly, the I/O subsystem 108 may be operable to identify devices on the bus, enumerate devices on the bus, allocate and de-allocate resources for various devices on the bus, and/or otherwise manage communications on the bus. For example, the I/O subsystem 108 may be a PCIe system and may comprise a PCIe root complex and one or more PCIe switches and/or bridges. In some instances the I/O subsystem 108 may be controlled by a hypervisor.

The network adapter 110 may comprise suitable logic, circuitry, interfaces, and/or code that may be operable to transmit and receive data in adherence with one or more networking standards. With reference to the OSI model, the network adapter 110 may implement physical layer functions, data link layer functions, and, in some instances, functions associated with OSI layer 3 and higher OSI layers. Similarly, with reference to the TCP/IP model, the network adapter 110 may be operable to implement network interface layer functions, Internet layer functions, and, in some instances, transport layer functions and application layer functions. The network adapter 110 may, for example, communicate in adherence with one or more Ethernet standards defined in IEEE 802.3, and may communicate with other portions of the network device 102 via the I/O subsystem 108. The network adapter 110 may be enabled to utilize virtualization such that it may present itself to the I/O subsystem 108 and/or to external devices as multiple network adapters. For example, in instances that I/O subsystem 108 is a PCIe system, the network adapter may support the SR-IOV specification. Accordingly, the network adapter 110 may interface to the I/O subsystem 108 via a physical function (PF) 118 and/or one or more virtual functions (VF) 120. In this manner, the network adapter 110 may utilize Virtual Ethernet Bridging (VEB) functionality (also known as eSwitch) to support direct communication with VMs, and may support indirect communication with other VMs via a vSwitch. In this regard, VEB functionality may comprise some of the functionality of an IEEE 802.1 compliant switch but may lack some features commonly available in stand-alone network switches. For example, the address table may be programmed rather than being learned on the fly. The vSwitch may be employed by a hypervisor running on and/or controlling the network device 102. The direct communication with VMs may be via one or more VFs 120 and/or PFs 118 and the communication with the vSwitch may be via one or more PFs 118.

With regard to communication between the VMs, conventional network adapters may either handle all such traffic internally, utilizing, for example, (VEB), or may handle all such traffic via an external switch—utilizing protocols such as Virtual Ethernet Port Aggregation (VEPA), VNTag, and Port Extender. In this regard, various tradeoffs may factor into a determination of whether to handle inter-VM traffic internally on a network adapter utilizing functionality such as VEB, or to handle inter-VM traffic externally utilizing protocols such as VEPA. For example, as compared to a conventional network adapter, an external device may have more resources to support more features, e.g., support for access control lists (ACLs), debug functionality, and capability of being supported by many standard network management tools. In this regard, including such features on the network adapter would add prohibitively to the cost and complexity of the network adapter. On the other hand, switching and processing traffic in an external device, rather than in a network adapter, consumes more network bandwidth and adds latency. The vSwitch may consume CPU cycles for its operation and may introduce more latency as compared with direct communication utilizing VEB functionality of the network adapter.

Accordingly, the network adapter 110, utilizing an entity for flexible virtual machine communications, achieves an optimal balance between parameters such as latency, external bandwidth, CPU utilization, and hardware cost/complexity by being operable to implement features that are not implemented on conventional network adapters, and being operable to interact with other entities, such as a hypervisor or external device like the network device 112, to implement additional features. The network adapter 110 may be operable to handle inter-VM traffic in a variety of ways and the manner in which the traffic is handled may depend on a variety of factors. In this regard, traffic may be handled (e.g., switched, encrypted, decrypted, authenticated, etc.) internally on the network adapter 110, handled externally on the network device 112, handled based on resources and/or capabilities of the network adapter 110, and/or handled based on an interaction between the network adapter 110 and the external network device 112. The manner in which inter-VM traffic is handled may, for example, be determined on a per-packet or per-dataflow basis.

Also, the network adapter 110 may be operable to, in some instances, or for some traffic, forward inter-VM traffic internally and send a copy or report of the inter-VM traffic to an external device such as the network device 112. Copying and/or reporting on inter-VM traffic is discussed below with respect to FIG. 6.

Figure 2:
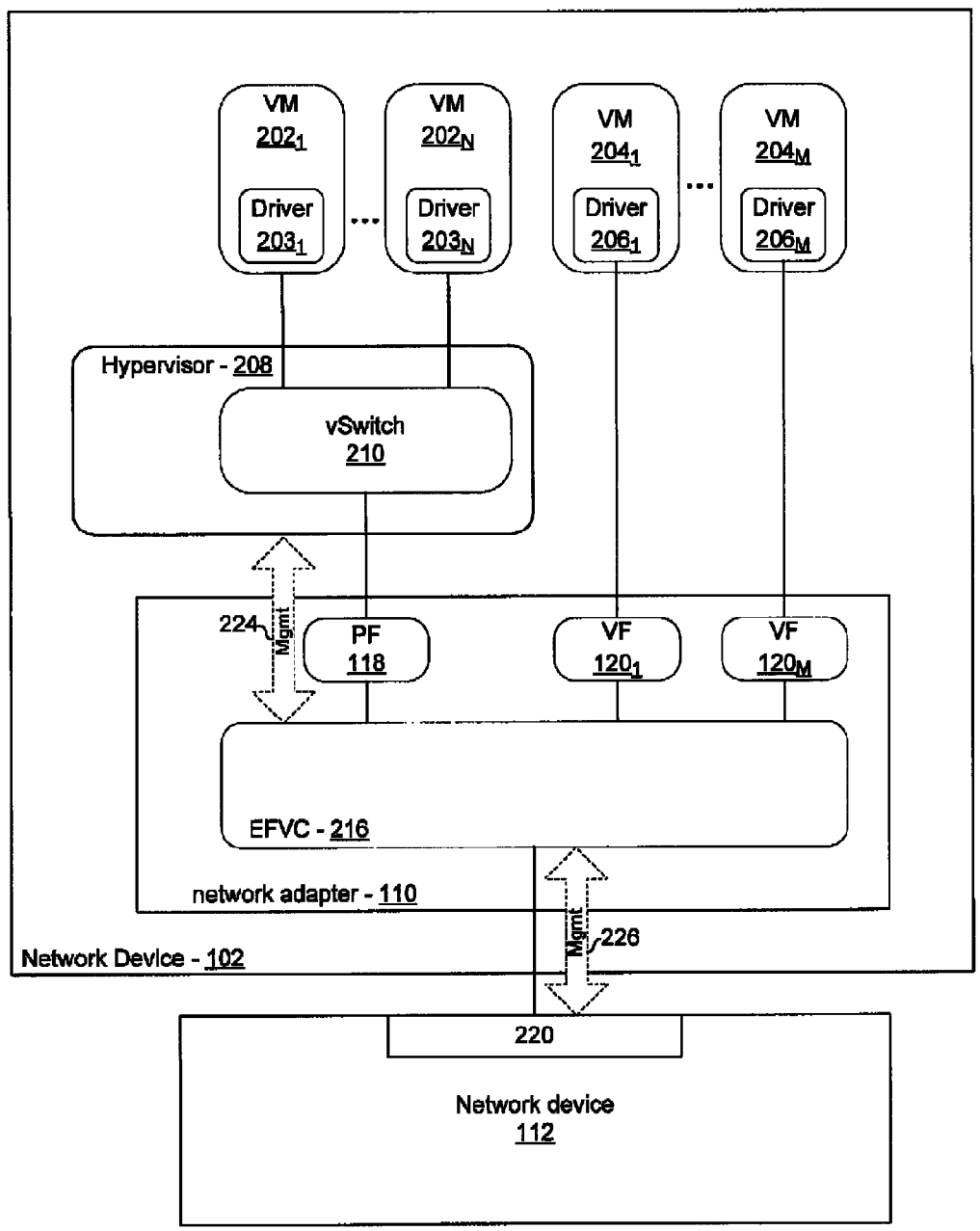
FIG. 2 is another diagram illustrating exemplary networking devices, in accordance with an embodiment of the invention.

FIG. 2 is a diagram illustrating management of networking devices, in accordance with an embodiment of the invention. Referring to FIG. 2, there are shown virtual machines (VMs) $202_1$-$202_N$ with associated drivers $203_1$-$203_N$, VMs $204_1$-$204_M$ with associated drivers $206_1$-$206_M$, a hypervisor 208, and a virtual switch (vSwitch) 210 running on the network device 102. Also shown are an Entity for Flexible Virtual machine Communications (EFVC) 216, and the physical function (PF) 118 and virtual functions (VFs) $120_1$-$120_M$ within the network adapter 110.

The vSwitch 210 may forward traffic to and from the VMs $202_1$-$202_N$ via the drivers $203_1$-$203_N$, and the vSwitch may comprise resources that are shared among the plurality of VMs $202_1$-$202_N$. The drivers $203_1$-$203_N$, when operating in a mode supportive of vSwitch operation, may not be directly coupled in hardware to the network adapter 110, and thus processor cycles may be required for communication between the vSwitch 210 and the VMs $202_1$-$202_N$ and scheduling delays may take place before communication is performed. As a result, there may be overhead associated with traversing the vSwitch 210 and data rates at which the VMs $202_1$-$202_N$ may communicate may be relatively limited as compared to data rates at which the VMs $204_1$-$204_M$ may communicate. Conversely, dedicated resources, adapted to interact directly with the network adapter 110 for the purpose of data transfer, such as drivers $206_1$-$206_M$, may be allocated to the VMs $204_1$-$204_m$ such that communications between the VMs $204_1$-$204_M$ and the network adapter 110 may bypass the vSwitch 210. In this manner, overhead associated with the vSwitch may be eliminated and it may appear as if there is a direct connection between the VMs $204_1$-$204_M$ and the network adapter 110, except potentially for configuration and/or some other control operations that may have to traverse the vSwitch and the network adapter PF. Such a direct data connection may be achieved by, for example use of dedicated bi-directional queues.

Thus, the VMs $204_1$-$204_M$ may support higher data rates, lower latencies, and have lower host CPU overhead for communication than the VMs $202_1$-$202_N$. However, there are a variety of reasons why the network device 102 would still want to support VMs such as $202_1$-$202_N$ which utilize a vSwitch. For example, the VMs $204_1$-$204_M$ require more hardware and thus there may be a point where supporting more VMs $204_1$-$204_M$ becomes impractical in terms of cost or complexity of the network device 102; whereas additional VMs $202_1$-$202_N$ may be supported through software. Also, legacy devices and/or components may lack support for the $204_1$-$204_M$. Accordingly, the network device 102 may support both types of VMs, and a particular task or function to be performed may dictate which type of communication will be available for a given VM. For convenience, the VMs $202_1$-$202_N$ are referred to herein as "vSwitched VMs" and the VMs $204_1$-$204_M$ are referred to as "direct VMs."

The Entity for Flexible Virtual machine Communications (EFVC) 216 may comprise suitable logic, circuitry, interfaces, and/or code that may enable communication of management information between the network adapter 110 and various other entities. For example, as indicated by the arrow 224, management information may be communicated between the EFVC 216 and internal entities, which comprise entities internal to the network device 102 such as the hypervisor 208 and/or any other internal management entity. Additionally or alternatively, as indicated by the arrow 226, management information may be communicated between the EFVC 216 and external entities, which comprise entities external to the network device 102, such as the network device 112 and/or any other external management entity. Communication of management information may be in-band with other traffic communicated to and/or from the network adapter 110. Additionally or alternatively, management information may be conveyed out-of-band with other traffic, via a dedicated physical and/or logical channel, for example. For example, management information may be communicated to and from the network adapter 110 via an application programming interface (API). That is, an EFVC 216 may expose an API to one or more internal and/or external entities, and the entities may utilize the API to configure or control the network adapter 110.

The EFVC 216 may also comprise suitable logic, circuitry, interfaces, and/or code that may be operable to handle traffic to and/or from the VMs $202_1$-$202_N$ and/or VMs $204_1$-$204_M$. For example, the EFVC 216 may be operable to perform packet switching and other packet processing functions such as enacting Access control lists (ACLs), traffic mirroring, collection of statistics, deciding where to perform packet switching for a given packet, encryption, decryption, authentication, etc. The manner in which the EFVC 216 handles traffic may be configured and/or controlled based on the communicated management information, based on resources of the EFVC 216 resources, and/or based on the how resources of the EFVC 216 are allocated. Such information may comprise, for example, address table(s) that comprise information (e.g., MAC and/or VLAN addresses) for forwarding unicast and/or multicast traffic, access control lists, world wide names, iSCSI qualified names, Fiber Channel over Ethernet (FCoE) world wide names, Ethertypes (e.g., Ethertypes used for FCoE Initialization Protocol (FIP)), statistics, error information, and/or other information associated with one or more of the VMs $202_1$-$202_N$ and/or VMs $204_1$-$204_M$. The address table(s) may comprise information that may be utilized to determine which ports and/or VMs are associated with, or subscribed to, various VLAN, MAC, IP, multicast, and/or other network addresses, and may be accessed to determine where to forward traffic.

In operation, the EFVC 216 may engage in communications of management information and may handle traffic based on the management information. In this manner, another entity, such as the network device 112 or the hypervisor 208, may act as a management proxy for the network adapter 110.

An exemplary sequence of steps in such management via the network device 112 may proceed as follows. First, management information may be communicated between the EFVC 216 and the network device 112. Such communications may be via an API and/or dedicated management channel, for example. Such communications may comprise, for example, information to configure and/or control mode of operation of the EFVC 216 and the network device 112. In this regard, such communications may comprise an exchange of the capabilities of the EFVC 216 and communication of the capabilities of the network device 112 to support the EFVC 216. In this manner, it may be ensured that the network device 112 and EFVC 216 are compatibly configured. This exchange may be done in-band and/or out-of-band and may use one or more standard protocols such as extensions to LLDP and/or DCBX. Second the network device 112 may provide and/or retrieve the management information, in accordance with a management protocol such as link layer discovery protocol (LLDP) and/or data center bridging exchange (DCBX), to the network management entity 122. Next, the network management entity 122 or virtualization related management entity (e.g., Vcenter or SCVMM) may make management decisions based on the management information. The network management entity 122 may then generate corresponding management information based on the decisions, and communicate the generated management information to the network device 112 to configure the network device 112 and the EFVC 216 into compatible modes of operation for handling inter-VM traffic. The communication from the network management entity 122 to the network entity 112 may be in accordance with a management protocol such as DCBX and/or extensions to LLDP and/or DCBX. The network device 112 may then communicate the decision and/or corresponding configuration information to the EFVC 216.

Another exemplary sequence of steps in such management via the network device 112 may proceed as follows. First, management information may be communicated between the EFVC 216 and the network device 112. Such communication may be via an API and/or dedicated management channel, for example. Such information may comprise, for example, historical, expected, and/or statistical information about inter-VM traffic that has been and/or may be handled in the network adapter 110. Second the network device 112 may provide and/or retrieve the management information, in accordance with a management protocol such as DCBX, SNMP, to the network management entity 122. Next, the network management entity 122 or virtualization related management entity may make management decisions based on the management information. The network management entity 122 may then generate corresponding management information based on the decisions, and communicate the generated management information to the network device 112. The communication from the network management entity 122 to the network entity 112 may be in accordance with a management protocol such as DCBX and/or some extensions to LLDP and/or DCBX and/or SNMP. The network device 112 may then communicate the decision to the EFVC 216.

The management information may be utilized by the EFVC 216 in determining how to handle traffic. In this regard, some and/or certain traffic may be handled within the network device 102, as is described with respect to, for example, FIG. 3 and some of the multicast traffic described with respect to FIG. 5, some and/or certain traffic may be handled via the network device 112, as is described with respect to, for example, FIG. 4 and some of the multicast traffic described with respect to FIG. 5, and some and/or certain traffic may be handled internally while copies of the traffic and/or information pertaining to the traffic may be forwarded to the network device 112, as is described with respect to FIG. 6. In this regard, filters and/or rules established by a network administrator and/or network management entity may determine how traffic is handled.

The network administrator and/or network management entity may be free to select the services/processing criteria desired for traffic, which in turn may determine, at least in part, how and where traffic is handled. In this regard, a manner in which particular traffic is handled may also depend on characteristics of the network adapter 110 as well as characteristics of traffic being handled. As a result, the device in which particular traffic is handled may vary depending on the traffic. For example, whether switching of particular traffic takes place in the network adapter 110, the network device 112, or, in some instances, the vSwitch 210, may vary depending on the traffic. With regard to the characteristics of the network adapter 110, the manner in which traffic is handled may depend on, for example, hardware and/or software resources present in the network adapter 110, and how the resources have been allocated. With regard to characteristics of the traffic, the manner in which it is handled may depend on, for example, a dataflow that the traffic is associated with, a value in one or more fields of the traffic (such as a source address field, a destination address field, or any other field), an ACL or other security mechanism, debug information associated with the traffic, whether or not the traffic was mirrored or is to be mirrored, latency requirements associated with the traffic, and/or bandwidth allocated and/or required for the traffic, and/or admin commands for certain services such as switched port analyzer (SPAN) or remote SPAN (RSPAN) information. In some instances, a user or admin could employ tools to identify the switching location of particular traffic.

As a result of the flexibility with which the network adapter 110 can handle traffic, an optimal balance may be achieved between latency, network bandwidth and/or network congestion on one hand and complexity of the network adapter 110 on the other. That is, the network adapter 110 may handle a substantial portion of inter-VM traffic internally, thus reducing network congestion, but also enable more complex services, enable scaling to a larger number of VMs, and/or enable scaling to a larger number of services by utilizing an external device to handle some traffic.

In addition to decisions about how to handle traffic, the management decisions may comprise, for example, determining whether to instantiate one or more VMs on the network device 102, determining whether to migrate one or more VMs to and/or from the network device 102 to balance the load on the network, determining whether to modify information in address tables or similar data structures, making decisions regarding network security, and other decisions working in cooperation with the hypervisor or an entity that manages the hypervisor.

Figure 3A:
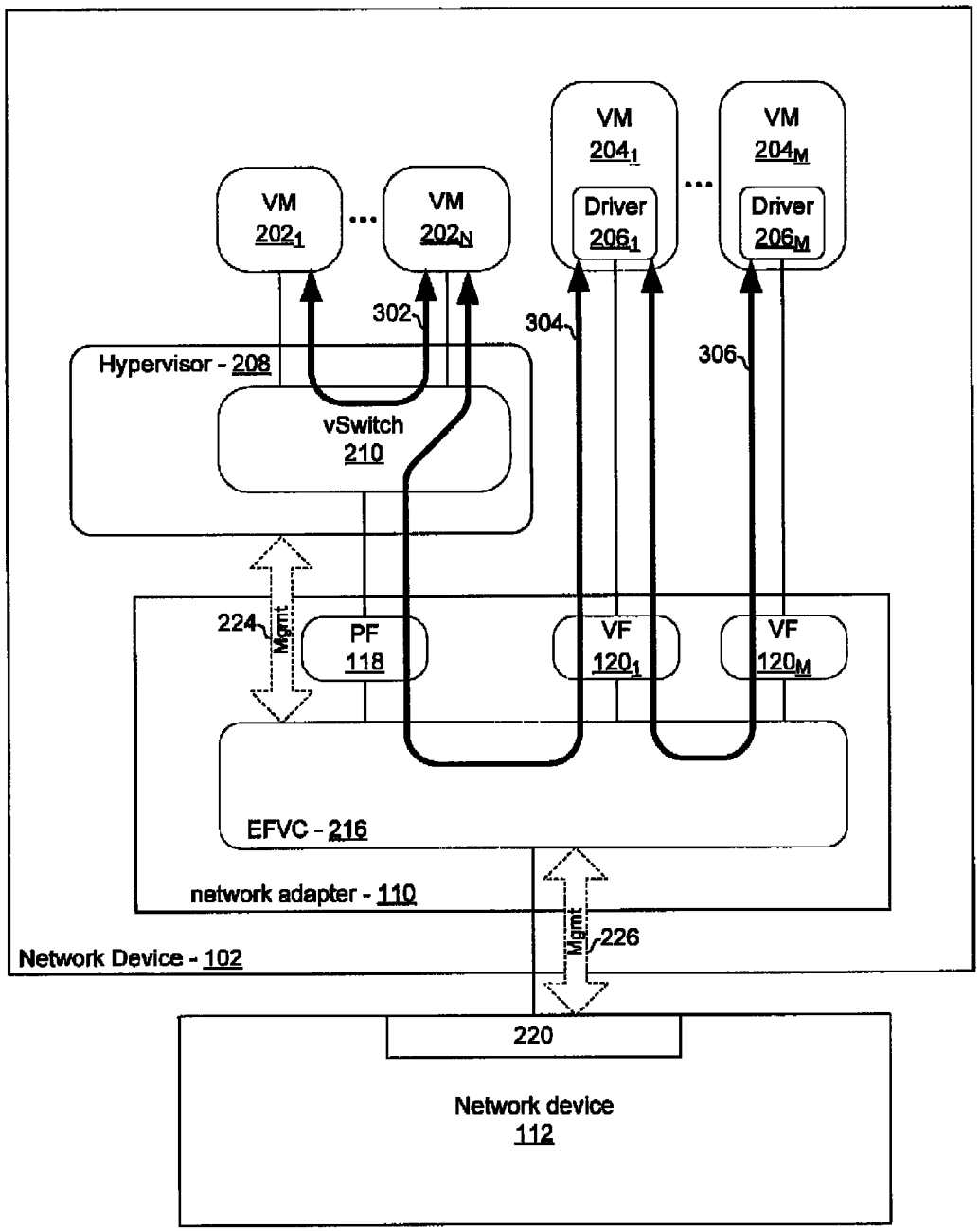
FIGS. 3A and 3B illustrate unicast inter-virtual-machine traffic being handled by a network device comprising an entity for flexible virtual machine communications (EFVC), in accordance with an embodiment of the invention.
Figure 3B:
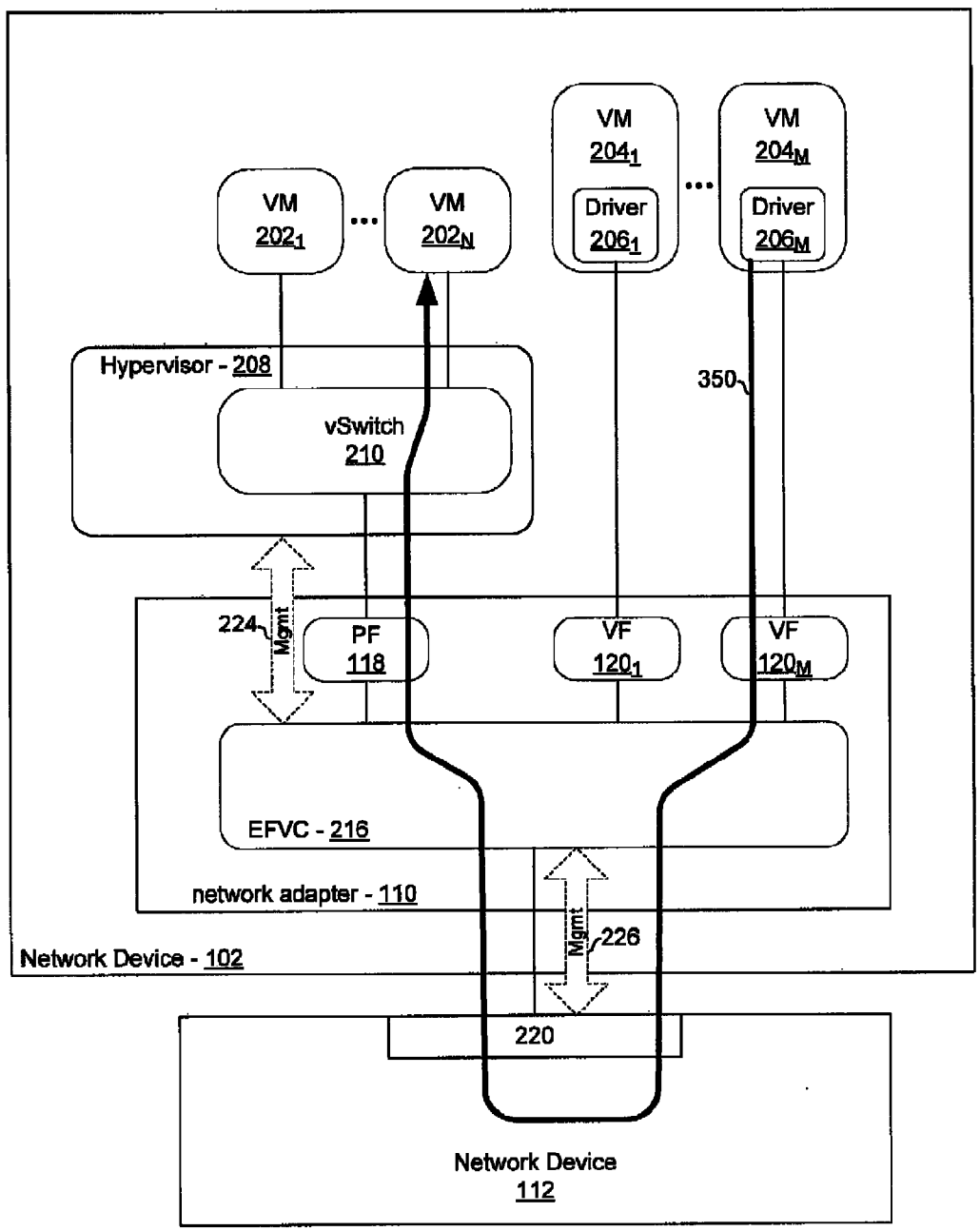

FIGS. 3A and 3B illustrate unicast inter-virtual-machine traffic being handled by a network device comprising an entity for flexible virtual machine communications (EFVC), in accordance with an embodiment of the invention. Referring to FIG. 3A, the path 302 indicates exemplary inter-VM traffic between vSwitched VM $202_1$ and vSwitched VM $202_N$, the path 304 indicates exemplary inter-VM traffic between vSwitched VM $202_N$ and direct VM $204_1$, and path 306 indicates exemplary inter-VM traffic between direct VM $204_1$ and direct VM $204_M$. Other paths, such as those described with respect to FIGS. 4-6, may be used to allow any of these VM to connect to the network device 112.

The EFVC 216 may store management information such as address tables (containing, for example, MAC addresses and/or VLAN tags including priority information), access control lists, other similar information, and/or other related information such that the EFVC 216 is operable to appropriately forward unicast traffic. In this regard, in some instances, the EFVC 216 may be operable to learn management information such as address tables on-the-fly, in a manner which may be similar to that of a conventional network switch. However, in some instances, the information in the EFVC 216 may be populated by a management entity 122 via the hypervisor 208 and/or the network device 112.

In the exemplary scenario depicted in FIG. 3A, an address table of the EFVC 216 may be sufficient to support all of the VMs $202_1$-$202_N$ and VMs $204_1$-$204_M$. That is, the EFVC 216 may know the port through which to forward traffic destined for any of the VMs $202_1$-$202_N$ and VMs $204_1$-$204_M$. Accordingly, the EFVC 216 may be operable to forward such unicast traffic, as indicated by paths 304 and 306, without the need to flood the traffic onto unnecessary ports. As for traffic between VMs $202_1$-$202_N$, such traffic may be handled by the vSwitch 210, as indicated by path 302.

In FIG. 3A, the path 302 does not comprise an external device, such as the network device 112. Consequently, in order for the network management entity 122 to be aware of the traffic on path 302, the hypervisor 208 may communicate management information regarding such traffic to the network management entity 122 or another management entity. In this regard, the hypervisor 208 may provide such information directly to the network device 112 and/or may provide such information via the EFVC 216. In the latter case, the hypervisor 208 may communicate the management informa-tion to the EFVC 216, and information may, in turn, be communicated from the EFVC 216 to the network management entity 122 via the network device 112.

In the scenario depicted in FIG. 3B, an address table of the EFVC 216 may be sufficient to support all of VMs $204_1$-$204_M$ but may not be sufficient to support all of the VMs $202_1$-$202_N$. That is, the EFVC 216 may not know the port through which to forward traffic destined for one or more of the VMs $202_1$-$202_N$. However, rather than flooding such traffic to all ports, the EFVC 316 may, as indicated by path 350, forward such traffic to the network device 112. The network device 112, when operating in VEPA mode, may know that the traffic is destined for an entity (e.g. a VM) on the network device 102 and thus send back to the EFVC 216. Upon return of the traffic to the EFVC 216, the EFVC 216 may, since it knows the address for all of the VMs $204_1$-$204_M$, determine that the traffic is not destined for any of the VMs $204_1$-$204_M$, and may forward the traffic only to the vSwitch 210, thus avoiding the need for flooding the traffic onto unnecessary ports. In this regard, as compared to a conventional switch which may flood all ports when it does not know the port through a destination may be reached, the EFVC 216, interacting with the network device 112, reduces or eliminates instances when such flooding is necessary.

Figure 4:
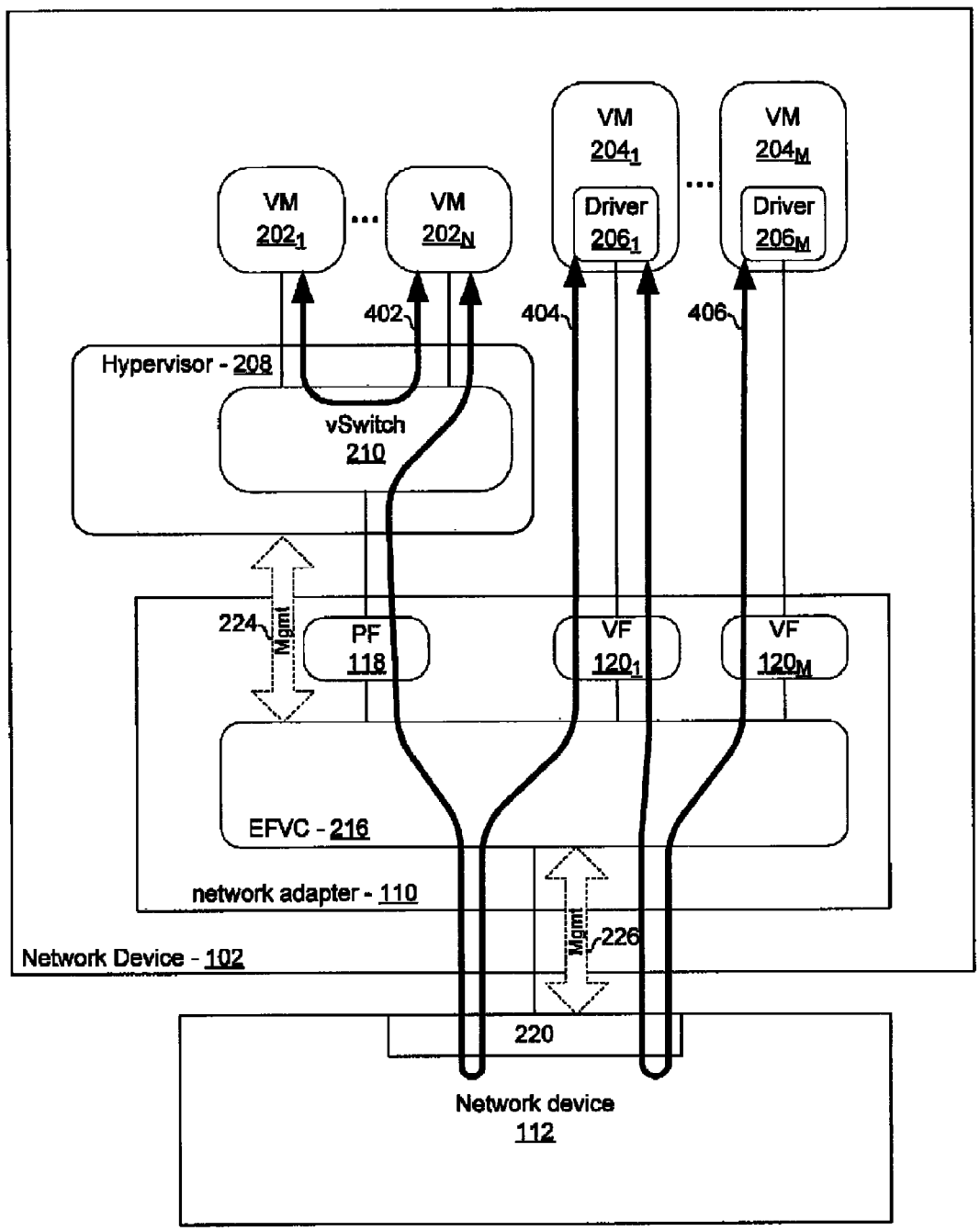
FIG. 4 is a diagram illustrating inter-virtual-machine traffic being handled via an external device, in accordance with an embodiment of the invention.

FIG. 4 is a diagram illustrating inter-virtual-machine traffic being handled via an external device, in accordance with an embodiment of the invention. Referring to FIG. 4, the path 402 indicates exemplary inter-VM traffic between vSwitched VM $202_1$ and vSwitched VM $202_N$, the path 404 indicates exemplary inter-VM traffic between vSwitched VM $202_N$ and direct VM $204_1$, and path 406 indicates exemplary inter-VM traffic between direct VM $204_1$ and direct VM $204_M$.

The EFVC 216 may store management information such as address tables, access control lists, other similar information, and/or other related information such that the EFVC 216 is aware of the paths 404 and 406 and operable to appropriately forward traffic along the paths 404 and 406. In this regard, in some instances the EFVC 216 may be operable to learn management information, such as address tables, on-the-fly as a conventional network switch may do. However, in some instances, the information in the EFVC 216 may be populated by the management entity 122 via the hypervisor 208 and/or the network device 112.

The path 402 does not comprise an external device, such as the network device 112. Consequently, in order for the network management entity 122 to be aware of the traffic on path 402, the hypervisor 208 may communicate management information regarding such traffic to the network management entity 122 or another management entity. In this regard, the hypervisor 208 may provide such information directly to the network device 112 and/or may provide such information via the EFVC 216. In the latter case, the hypervisor 208 may communicate the management information to the EFVC 216, and information may, in turn, be communicated from the EFVC 216 to the network management entity 122 via the network device 112. Thus, such information may be communicated along the path 402 while the network device 112 and the EFVC 216 are configured into modes that utilize protocols such as VEPA, VNtag, and Port Extender. However it the path 402 may also be used in instances that the EFVC 216 runs out of resources to handle inter-VM traffic internally.

Figure 5A:
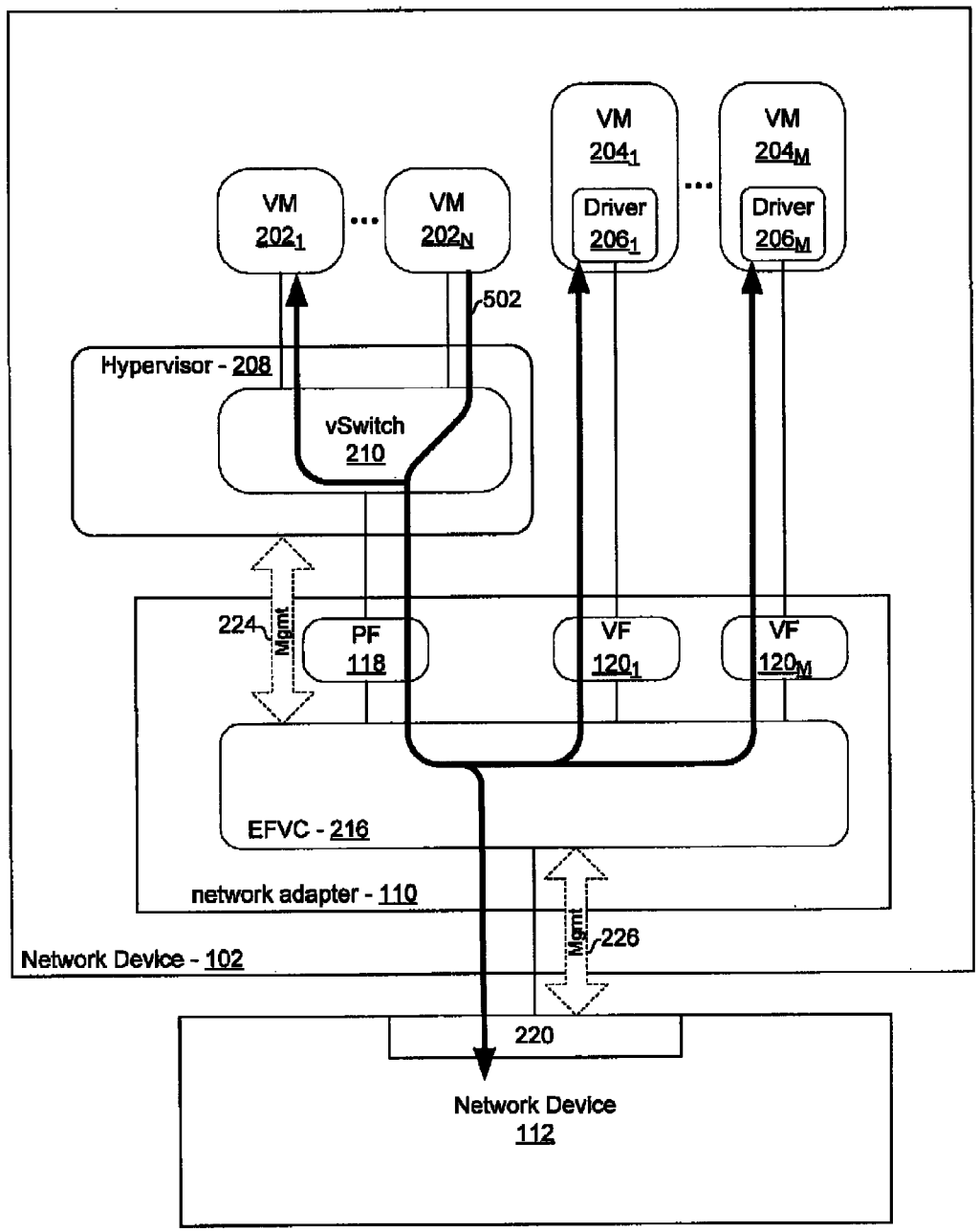
FIGS. 5A and 5B illustrate communication of multicast traffic, in accordance with an embodiment of the invention.
Figure 5B:
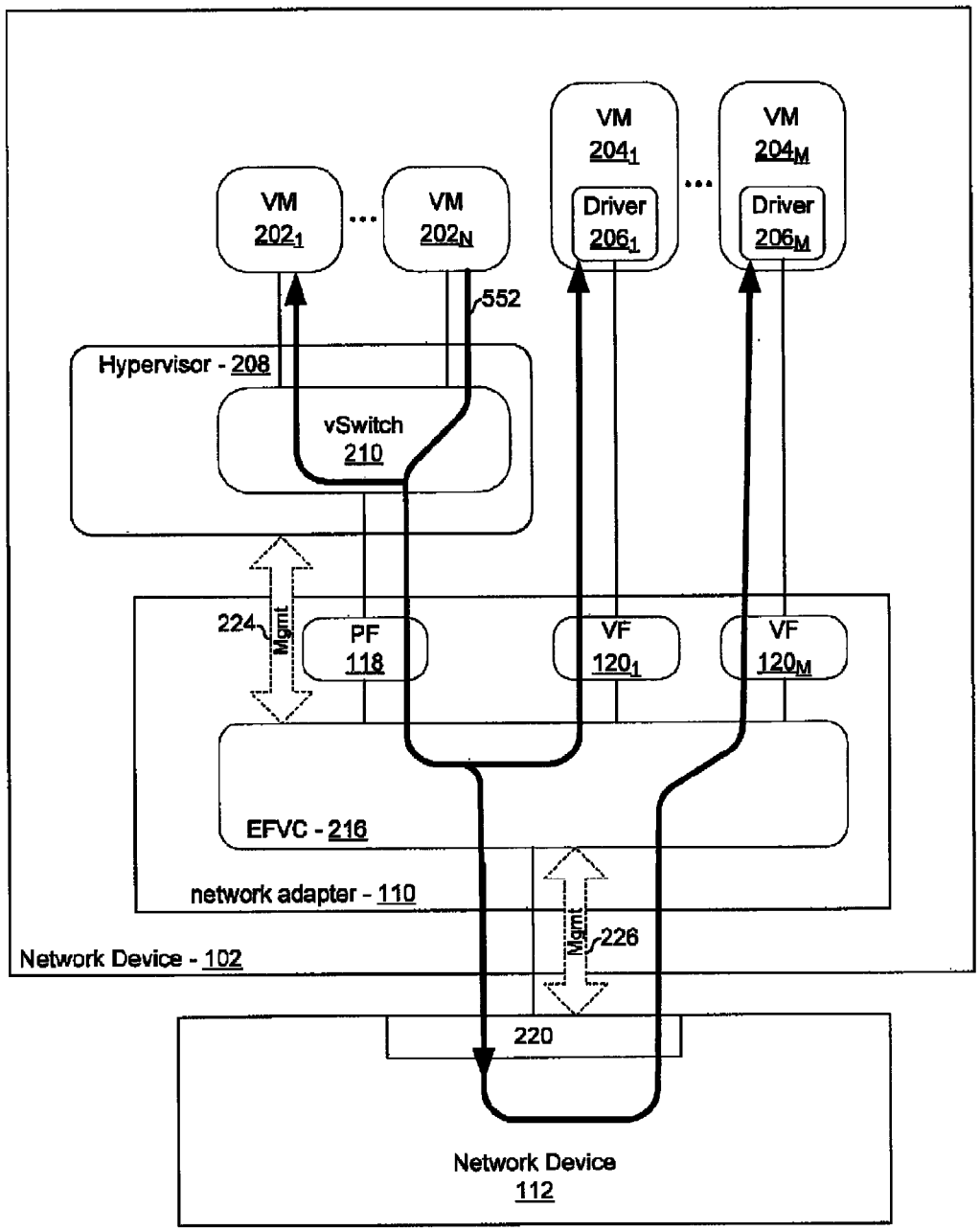

FIGS. 5A and 5B illustrate communication of multicast traffic, in accordance with an embodiment of the invention. Referring to FIGS. 5A and 5B, there is shown the network devices 102 and 112.

For handling multicast traffic, the EFVC 216 may store management information such as address tables, other similar information, and/or other related information such that the EFVC 216 may be operable to appropriately forward multicast traffic. In this regard, the information in the EFVC 216 may be populated by the hypervisor 208 and/or by the network management entity 122 via the network device 112. In various embodiments of the invention, such address tables may be of limited capacity and thus the EFVC 216 may be operable to take advantage of services and/or functions provided by the network device 112 to extend the capabilities of the EFVC 216 for handling multicast traffic.

In the scenario depicted in FIG. 5A, an address table of the EFVC 216 may be sufficient to support all of the VMs $204_1$-$204_M$. That is, the EFVC 216 may know a port via which each of the VMs $204_1$-$204_M$ is reachable. Accordingly, as shown by path 502, for multicast traffic emanating from one of the VMs $202_1$-$202_N$, the vSwitch 210 may forward the traffic to any one or more of the VMs $202_1$-$202_N$ to which the traffic should be forwarded, and the EFVC 216 may forward the multicast traffic to any one or more of the VMs $204_1$-$204_M$ to which the multicast traffic should be forwarded. Multicast traffic destined for devices external to the network device 102 may be sent to the network device 112.

However, in the scenario depicted in FIG. 5B, an address table of the EFVC 216 may not be sufficient to support all of the VMs $204_1$-$204_M$. For example, the EFVC 216 may not know how to reach VM $204_M$. Accordingly, the network device 112 may be used to extend the capabilities of the EFVC 216 on an as-needed basis. Thus, as shown by path 552, for multicast traffic emanating from one of the VMs $202_1$-$202_N$, the vSwitch 210 may handle forwarding the multicast traffic to any one or more of the VMs $202_1$-$202_N$ that should receive the traffic, and the EFVC 216 may send the multicast traffic destined for the VM $204_M$, to the network device 112. The network device 112, when operating in VEPA mode, may know that the traffic is destined for the network device 102 and may thus send the traffic back to the network device 102. The EFVC 216 may then send the traffic to any one or more of the VMs $204_1$-$204_M$ that it determines may have subscribed for the multicast traffic, or the EFVC 216 may flood the traffic to all of the VMS $204_1$-$204_M$. Thus, the scenario of FIG. 5B illustrates instances in which excessive copies may be received by some of the VMs $204_1$-$204_M$. However, the EFVC 216 may guarantee the originator of the multicast traffic is not copied by checking the source address and not sending it to the originator, in instances that the originator was one of the VMs $204_1$-$204_M$. In this manner, no duplicates or feeding back to the source will occur. Furthermore, the scenario described with respect to FIG. 5B may be the only scenario in which excessive copies are received. Thus, the EFVC 216 may improve handling of multicast traffic over conventional network adapters by reducing the amount of multicast traffic sent to ports which are not supposed to receive the traffic. Moreover, in some embodiments of the invention, scenarios such as the one in FIG. 5B may be reduced or eliminated by the EFVC 216 tagging the multicast traffic prior to sending it to the network device 112. In this regard, upon receiving the multicast traffic back from the network device 112, the tag(s) will enable the EFVC 216 to know which VMs $204_1$-$204_M$ have already received the traffic.

Figure 6:
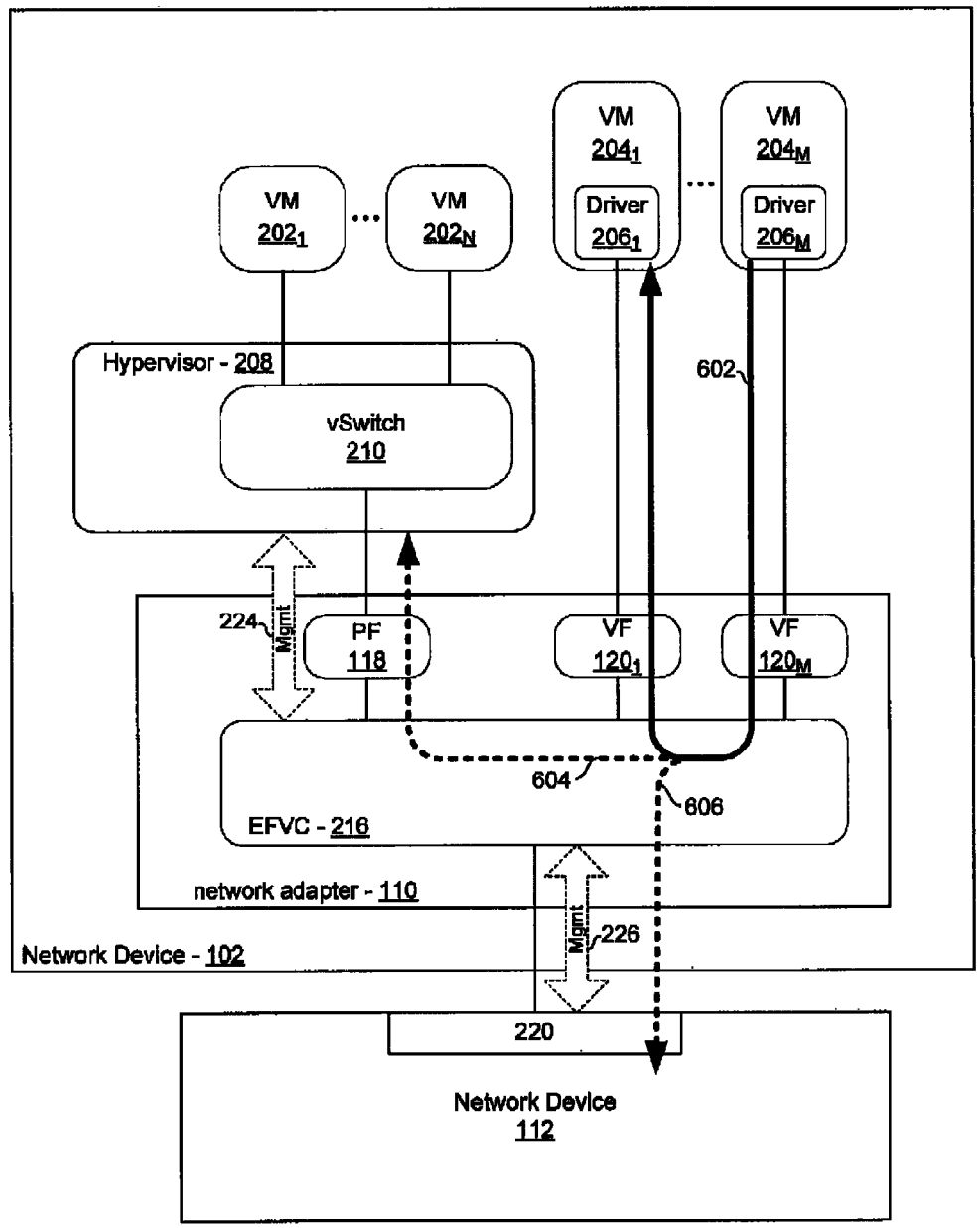
FIG. 6 is a diagram illustrating copying or mirroring of inter-virtual-machine traffic for network management, in accordance with an embodiment of the invention.

FIG. 6 is a diagram illustrating copying or mirroring of inter-virtual-machine traffic for network management, in accordance with an embodiment of the invention. Referring to FIG. 6, the path 602 indicates unicast inter-VM traffic between direct VMs $204_1$ and $204_M$, the path 604 indicates corresponding traffic communicated from the network adapter 110 to the hypervisor 208, and the path 606 indicates corresponding traffic communicated from the network adapter 110 to the network device 112. The corresponding traffic communicated along paths 604 and/or 606 may be utilized by other devices to determine, for example, traffic patterns and/or loads in the network device 102 and/or used for debug purposes.

In some instances, the corresponding traffic communicated along paths 604 and 606 may comprise, for example, a replica of each packet of the inter-VM traffic, replicas of selected packets of the inter-VM traffic, replicas of portions, such as a header or payload, of each packet of the inter-VM traffic, and/or replicas of portions, such as a header or payload, of selected packets of the inter-VM traffic. In this manner, the traffic on the path 602, or a portion thereof, may be copied to the hypervisor 208 and/or the network device 112. In turn, the hypervisor 208 and/or the network device 112 may make information regarding inter-VM traffic in the network device 102 available to an external network management entity 122. In some instances the corresponding traffic may be modified or otherwise marked such that it may be differentiated from the original traffic. Additionally and/or alternatively, the traffic communicated along the paths 604 and 606 may not be a copy of traffic on the path 602, but rather, may report on the traffic communicated via the path 602. For example, the traffic along paths 604 and 606 could be a summary and/or simple notification messages requiring little bandwidth and/or processing resources.

Copying or reporting of inter-VM traffic may be for network management purposes. In this regard, when the network device 102 routes inter-VM traffic internally, the traffic may otherwise be unknown to the network management entity 122 and thus the network management entity 122 would not be able factor such traffic into network management operations, where such operations comprise, for example, configuring how the network adapter 110 handles inter-VM traffic, determining whether to instantiate and/or migrate VMs to balance loads in the network, collecting network statistics, and debugging of network problems or provide security services such as ACL or similar.

In-band and/or out-of-band mechanisms may be utilized by an entity receiving the copied traffic (e.g., the hypervisor 208 and/or the network device 112) to determine that the traffic is copied. An in-band mechanism may comprise, for example, flagging, marking, and/or otherwise modifying the copied traffic to indicate that it is a copy. An exemplary out-of-band mechanism may comprise a signal, message, and/or other notification sent to the entity prior to, and/or via a different channel than, the copied traffic. For example, the out-of-band notification may configure the network device 112 into a VEPA mode and may configure other services (e.g., ACL processing, mirroring, address table extensions, etc.) of the network device 112. Such configuration, may allow the network device 112 to process the traffic received from the EFVC 216 and provide the necessary and/or desired services for processing of a packet, and then take appropriate action. Such appropriate action may comprise, for example, sending the packet back to the EFVC 216, such that the EFVC 216 may then need only forward the processed packet to its destination, send it to another device for debug and/or additional processing, and/or drop the packet. For example, the out-of-band notification may configure the entity into a mode of operation in which all traffic is handled as copied traffic until a subsequent notification is received. For another example, the out-of-band notification may configure the entity into a mode of operation in which particular traffic, such as the next 'K' packets (where K is an integer), is handled as copied traffic. Similarly, the out-of-band notification may configure the entity into a mode of operation in which traffic received during a particular time interval, or traffic received via a certain port, is handled as copied traffic. Furthermore, copied traffic may be handled in a variety of ways. For example, the hypervisor 208 and/or network device 112, may determine that the copied traffic need not be forwarded to another network device, should only be forwarded to a network management entity 122, and/or that a summary of the copied traffic should be forwarded to a network management entity 122

Although FIG. 6 illustrates unicast traffic between direct VMs $204_1$ and $204_M$, paths similar to paths 604 and 606 may also be utilized for other unicast and/or multicast traffic to and/or from eSwitched VMs 202 and/or direct VMS 204. For example, for traffic between switched VMs $202_1$ and $202_N$, the hypervisor 208 may forward copies to the EFVC 216 and/or the network device 112.

Additionally, although FIG. 6 illustrates the network device 112 providing mirroring services and/or functionality, the invention is not so limited. In this regard, any other EFVC services may be extended by use of network device 112 or use of vSwitch 210 and/or its associated software or APIs. Similarly the EFVC 216 may be used to extend the services provided by the vSwitch 210.

Figure 7:
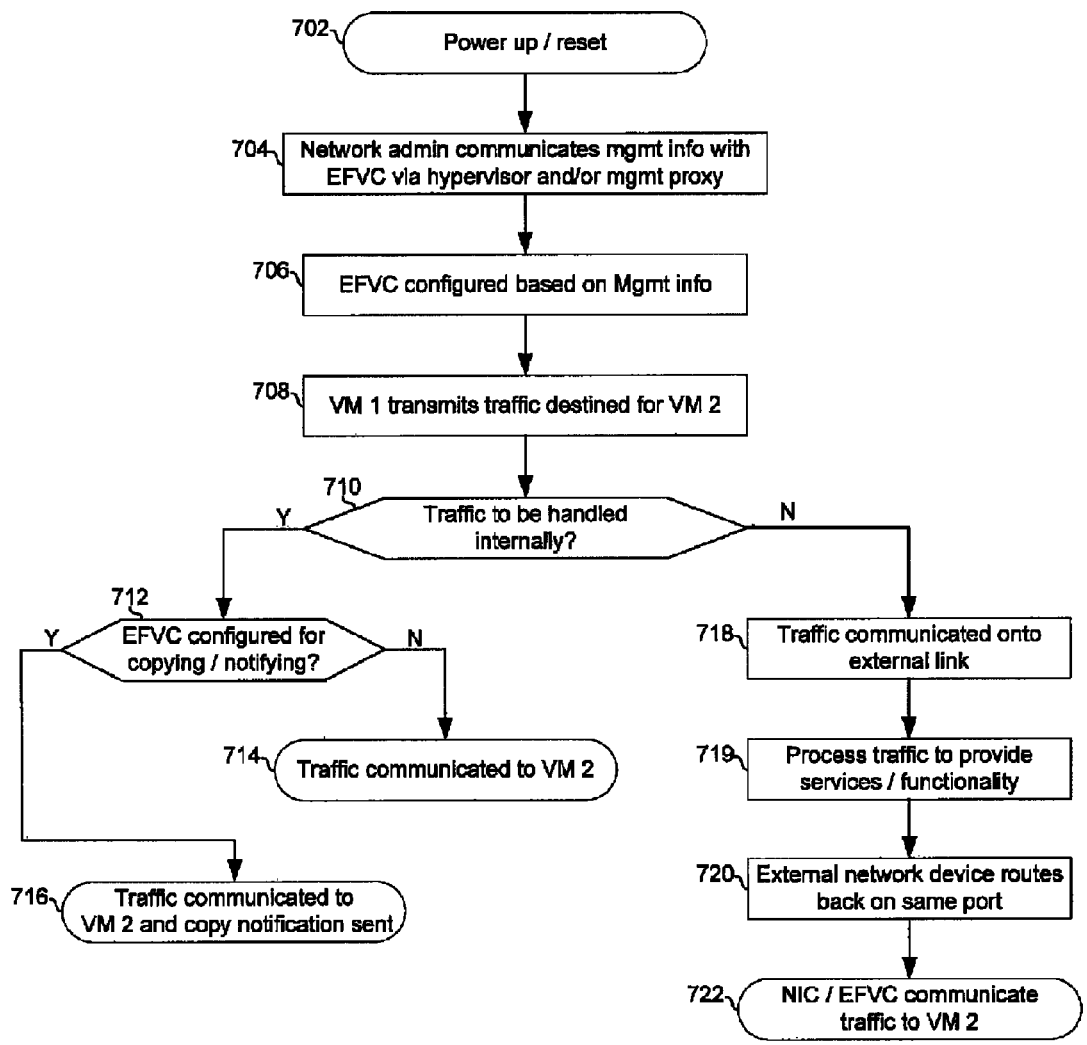
FIG. 7 is a flow chart illustrating exemplary steps for handling VM traffic, in accordance with an embodiment of the invention.

FIG. 7 is a flow chart illustrating exemplary steps for handling VM traffic, in accordance with an embodiment of the invention. Beginning with step 702, the network device 102 may be powered up and/or reset. In step 704, management information may be communicated between the EFVC 216 and a network management entity 122. Such management information may be communicated via the hypervisor 208 and/or the network device 112. In this regard, the network device 112 may act as a management proxy for the network device 102. In step 706, the EFVC 216 may itself be configured and/or may configure the network adapter 110, the hypervisor 208, and/or other portions of the network device 102 based on the communicated management information. In this manner, rules, filters, capabilities, policies, permissions, and/or other criteria utilized to determine a manner in which the inter-VM traffic is handled may be configured. The management information may comprise, for example, address tables, access control lists, or similar information that may be stored in the network adapter 110 for handling traffic. The access control list may comprise information that may determine permissions associated with various VMs and/or other network entities. In step 708, a first VM running on the network device 102 may begin sending traffic to a second VM running on the network device 102. In step 710, the manner in which the inter-VM traffic is handled may be determined based on various rules, filters, factors, permissions, capabilities, or any other criteria determined by a network administrator and/or configured in step 706. For example, ACL processing may be required for traffic but the network adapter 110 may not support ACL or its ACL capabilities are maxed out. In instances that the traffic is to be handled externally, the exemplary steps may advance to step 718.

In step 718, the inter-VM traffic may be forwarded to the network device 112 via port 220 of the network device 112. In step 719, the network device 112 may process the inter-VM traffic in accordance with rules established by a user and/or admin and to provide services and or functionality that the EFVC 216 was unable to provide. In step 720, the network device 112 may determine that the traffic is destined for a VM on the network device 102 and may accordingly forward the traffic back to the network device 102 via the port 220. Also during step 720, the network device 112 may generate and/or update information that may be utilized for network management. For example, the network device 112 may update a table that stores statistical information regarding traffic patterns in the network. Additionally, during step 720, prior to forwarding, the network device 112 may provide services which are not implemented and/or enabled on the network adapter 110. For example, the network device 112 may perform complex processing associated with implementing one or more security protocols. In step 722, the traffic may be received by the network adapter 110 and may be forwarded to the destination VM.

Returning to step 710, in instances that the traffic is to be handled internally, the exemplary steps may advance to step 712. In step 712 it may be determined whether the network adapter 110 has been configured to forward copies of, or to report on, the inter-VM traffic. If the network adapter 110 has not been configured to send copies and/or reports, then in step 714 the traffic may be communicated to the destination VM. If the network adapter 110 has been configured to send copies and/or reports, then in step 716 the traffic may be communicated to the destination VM, and a copy of the traffic, or report regarding the traffic, may be communicated to, for example, the hypervisor 208 and/or network device 112. The copy and/or notification may be subsequently communicated to a network management entity 122.

Figure 8:
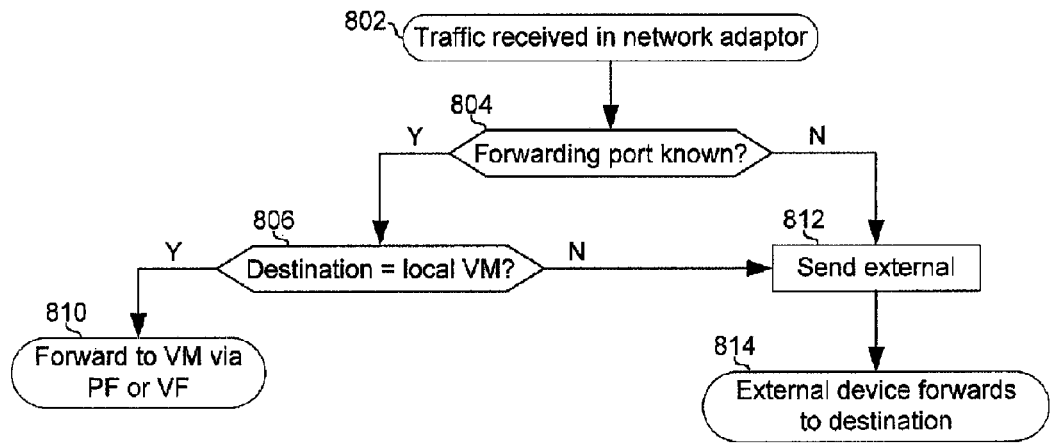
FIG. 8 is a flow chart illustrating handling traffic internally or externally based on contents of a address table in the network adapter, in accordance with an embodiment of the invention.

FIG. 8 is a flow chart illustrating handling traffic internally or externally based on contents of an address table in the network adapter, in accordance with an embodiment of the invention. Referring to FIG. 8, the exemplary steps may begin with step 802 when traffic is received in the network adapter 110 from a local source such as a VM 202 or 204. In step 804, the EFVC 216 may search an address table of the network adapter 110 for the destination address of the traffic. In instances that the destination address is found in the address table, the exemplary steps may advance to step 806.

In step 806, it may be determined whether the traffic is destined for traffic destined for one or more of the VMs $202_1$-$202_N$ and $204_1$-$204_M$. In instances that the traffic is destined for one or more of the VMs $202_1$-$202_N$ and $204_1$-$204_M$, then in exemplary steps may advance to step 810. Also, in instances that the traffic is destined for one or more of the VMs $202_1$-$202_N$ and $204_1$-$204_M$, the EFVC 216 may send a copy or report of the traffic to the network device 112 and/or the hypervisor 208. In such instances, an in-band and/or out-of-band notification may be sent such that the network device 112 and/or hypervisor 208 knows, and is configured, to handle the copied traffic.

In step 810, the traffic may be forwarded to the VM(s) via the appropriate VF(s) and/or PF(s).

Returning to step 806, in instances that the traffic is not destined for one or more of the VMs $202_1$-$202_N$ and $204_1$-$204_M$, then in the exemplary steps may advance to step 812.

In step 812, the traffic may be sent to the network device 112. In some embodiments of the invention, an out-of-band notification may be sent to the network device 112 during and/or prior to step 812 to configure the network device 112 in a mode for handling such traffic. For example, such a notification may configure the network device 112 into a VEPA mode. Subsequent to step 812, the exemplary steps may advance to step 814.

In step 814, the network device 112 may utilize its resources, which may be greater than the network adapter 110, to determine where to forward the traffic. In this regard, it may be such that the EFVC 216 has the addressing information for VMs $204_1$-$204_M$ but not for VMs $202_1$-$202_N$ and thus exemplary step 814 may be reached for traffic that is destined for one of more of the VMs $202_1$-$202_N$. In such instances, the network device 112 may forward the traffic back on the port via which it was received. Consequently, the EFVC 216, upon received the same traffic via the same port may be operable to determine that the traffic must be destined for one or more of the VMs may forward the packet to the vSwitch. Alternatively, the network device 112 may provide an out-of-band notification to the EFVC 216 to update the address table of the network adapter 110 such that the EFVC 216 knows where to forward to. In instances that the destination is external to the network device 102, then the network device 112 may forward the traffic via one or more appropriate ports different from the port on which the traffic was received.

Returning to step 804, in instances that the destination address is not found in the address table of the network adapter 110, then the exemplary steps may advance to step 812.

In this manner, the network adapter 110 may more handle the traffic more efficiently than a conventional network device which may simply flood the traffic to all VMs as well as to the network device 112.

Similar to the above description with regard to address tables, traffic may be handled in a similar manner based on an access control list (ACL) or other security mechanism. In this regard, in instances that the EFVC 216 has sufficient resources to implement an ACL and/or other security mechanism, the management entity 122 may communicate, via the network device 112 and/or hypervisor 208, the ACL information to the EFVC 216 and the EFVC 216 may handle traffic, e.g., determine whether to forward or drop traffic, in accordance with the ACL and/or other security mechanism. Alternatively, when the EFVC 216 does not have sufficient resource available to store and/or implement an ACL or other security mechanism, the EFVC 216 may send the relevant traffic, e.g., traffic for which the EFVC 216 is uncertain as to the applicability of the ACL, to the network device 112. The network device 112, in a VEPA mode, may then handle the traffic in accordance with the ACL and then return the traffic to the EFVC 216.

Aspects of a method and system for virtual machine networking are provided. In an exemplary embodiment of the invention, an EFVC 216, residing in the network adapter 110 of the first network device 102, may comprise one or more circuits and/or processors that may be operable to determine whether to communicate traffic between two or more of VMs $202_1$-$202_N$ and/or $204_1$-$204_M$ via a path, such as paths 304 and 306, that resides solely within the first network device 102, or via a path, such as path 350, that comprises the second network device 112. The determination may be based, at least in part, on characteristics of the traffic. The determination may be based, at least in part, on capabilities and/or available resources of the network adapter 110. The determination may be based, at least in part, on management information exchanged between the EFVC 216 and one or more of: software, such as hypervisor 208, running on the first network device, the second network device 112, and/or a third network device. The second network device 112 may participate in network management protocols on behalf of the first network device 102. The management information may be exchanged via an application programming interface (API) made available by the one or more circuits and/or processors.

The traffic may be communicated via the path comprising the second network device 112 in instances that addressing information associated with the traffic is not in an address table of the network adapter 110. The traffic may be communicated via the path comprising the second network device in instances that the network adapter 110 is unable to perform one or more security functions required for handling the traffic. The traffic may be communicated via the path comprising the second network device 112 in instances that the network adapter 110 is unable to perform one or more management functions required for the traffic. In instances that the traffic is communicated via the path that comprises the second network device 112, the second network device 112 may process the traffic and return the processed traffic to the first network device 102. Processing performed by the second network device 112 may comprise, for example, looking up addressing information associated with the traffic in an address table of the second network device 112, performing the one or more management functions required for handling the traffic, and/or performing the one or more security functions required for handling the traffic.

Also, the EFVC 216 may be operable to communicate a copy of the traffic, or a report on the traffic, to the second network device 112, and the second network device 112 may utilize the copy of the traffic for management operations. One or more tags, fields, and/or headers of the copy of the traffic may enable the second network device 112 to determine that the copy of the traffic is a copy. Additionally or alternatively, an indication from the EFVC 216 may enable the second network device 112 to determine that the copy of the traffic is a copy. The indication may be communicated out-of-band from the copy of the traffic.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for virtual machine networking.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for networking, the system comprising:
one or more circuits, one or more processors, or any combination thereof for use in a network adapter of a first network device, wherein said one or more circuits, said one or more processors, or said combination thereof are operable to:
determine whether to communicate traffic between virtual machines running on said first network device via a path that resides solely within said first network device, or via a path that comprises a second network device that is external to said first network device, wherein said determination is based on characteristics of said traffic.

2. The system according to claim 1, wherein said determination is based on management information exchanged between said one or more circuits, said one or more processors, or said combination thereof and one or more of:
host-resident software running on said first network device;
said second network device; and
a third network device.

3. The system according to claim 1, wherein said determination is based on capabilities, available resources, or a combination capabilities and available resources of said network adapter.

4. The system according to claim 1, wherein, in instances that said traffic is communicated via said path that comprises said second network device, said second network device performs processing of said traffic and then sends said processed traffic back to said first network device.

5. The system according to claim 4, wherein said traffic is communicated via said path that comprises said second device in instances that addressing information associated with said traffic is not in an address table of said network adapter.

6. The system according to claim 5, wherein said processing comprises looking up addressing information associated with said traffic in an address table of said second network device.

7. The system according to claim 4, wherein said traffic is communicated via said path that comprises said second device in instances that said network adapter is unable to perform one or more management functions required for handling said traffic.

8. The system according to claim 7, wherein said processing comprises performing said management functions.

9. The system according to claim 4, wherein said traffic is communicated via said path that comprises said second device in instances that said network adapter is unable to perform one or more security functions required for handling said traffic.

10. The system according to claim 9, wherein said processing comprises performing said one or more security functions.

11. The system according to claim 1, wherein second network device participates in network management protocols on behalf of said first network device.

12. The system according to claim 1, wherein a copy of said traffic, or a report on said traffic, is communicated to said second network device and said second network device utilizes said copy or said report for management operations.

13. The system according to claim 12, wherein one or more of a tag, a field, a header, or a combination thereof of said copy of said traffic enable said second network device to determine that said copy of said traffic is a copy.

14. The system according to claim 12, wherein said one or more circuits, said one or more processors, or said combination thereof are operable to generate a notification that enables said second network device to determine that said copy of said traffic is a copy, where said notification is communicated out-of-band in relation to said copy of said traffic.

15. The system according to claim 1, wherein said one or more circuits, said one or more processors, or said combination thereof make an application programming interface available to a hypervisor, to said second network device, or to both, and said application programming interface is utilized for configuring said network adapter.

16. A method for networking, the method comprising:
performing by one or more circuits, one or more processors, or any combination thereof in a network adapter of a first network device:
determining whether to communicate traffic between virtual machines running on said first network device via a path that resides solely within said first network device, or via a path that comprises a second network device that is external to said first network device, wherein said determination is based on characteristics of said traffic.

17. The method according to claim 16, wherein said determination is based on management information exchanged between said one or more circuits, said one or more processors, or said combination thereof and one or more of:
host-resident software running on said first network device;
said second network device; and
a third network device.

18. The method according to claim 16, wherein said determination is based on capabilities, available resources, or a combination capabilities and available resources of said network adapter.

19. The method according to claim 16, wherein, in instances that said traffic is communicated via said path that comprises said second network device, said second network device performs processing of said traffic and then sends said processed traffic back to said first network device.

20. The method according to claim 19, comprising determining, by said one or more circuits, said one or more processors, or said combination thereof, to communicate said traffic via said path that comprises said second device in instances that addressing information associated with said traffic is not in an address table of said network adapter.

21. The method according to claim 20, wherein said processing comprises looking up addressing information associated with said traffic in an address table of said second network device.

22. The method according to claim 19, comprising determining, by said one or more circuits, said one or more processors, or said combination thereof, to communicate said traffic via said path that comprises said second device in instances that said network adapter is unable to perform one or more management functions required for handling said traffic.

23. The method according to claim 22, wherein said processing comprises performing said management functions.

24. The method according to claim 19, comprising determining, by said one or more circuits, said one or more processors, or said combination thereof, to communicate said traffic via said path that comprises said second device in instances that said network adapter is unable to perform one or more security functions required for handling said traffic.

25. The method according to claim 24, wherein said processing comprises performing said one or more security functions.

26. The method according to claim 16, wherein second network device participates in network management protocols on behalf of said first network device.

27. The method according to claim 16, comprising communicating, by said one or more circuits, said one or more processors, or said combination thereof, a copy of said traffic, or a report on said traffic, to said second network device, where said second network device utilizes said copy or said report for management operations.

28. The method according to claim 27, comprising inserting, by said one or more circuits, said one or more processors, or said combination thereof, one or more of a tag, a field, a header, or a combination thereof in said copy of said traffic, wherein said tag, said field, said header, or said combination thereof enable said second network device to determine that said copy of said traffic is a copy.

29. The method according to claim 27, comprising generating, by said one or more circuits, said one or more processors, or said combination thereof, a notification that enables said second network device to determine that said copy of said traffic is a copy, where said notification is communicated out-of-band in relation to said copy of said traffic.

30. The method according to claim 16, wherein said one or more circuits, said one or more processors, or said combination thereof make an application programming interface available to a hypervisor, to said second network device, or to both, and said application programming interface is utilized for configuring said network adapter.

\* \* \* \* \*